United States Patent

Skokan et al.

[11] Patent Number: 5,834,775
[45] Date of Patent: Nov. 10, 1998

[54] INTEGRAL SLOT SHIELD FOR INFRARED FOCAL PLANE ARRAYS

[75] Inventors: Mark R. Skokan, Garland; John C. Ehmke, Mesquite; Charles A. Franda, Plano; Stephen L. Whicker, Dallas, all of Tex.

[73] Assignee: Raytheon TI Systems, Inc., Lewisville, Tex.

[21] Appl. No.: 768,254

[22] Filed: Dec. 17, 1996

Related U.S. Application Data

[60] Provisional application No. 60/011,590 Jan. 3, 1996.
[51] Int. Cl.$^6$ .............................. H01L 27/14; G01J 5/08; G01J 5/10
[52] U.S. Cl. ........................................ 250/332; 250/370.08
[58] Field of Search .......................... 250/332, 370.08, 250/208.1, 338.4; 359/359

[56] References Cited

U.S. PATENT DOCUMENTS

| | | | |
|---|---|---|---|
| 4,970,567 | 11/1990 | Ahlgren et al. | 357/30 |
| 5,243,458 | 9/1993 | Hatano et al. | 359/359 |
| 5,298,733 | 3/1994 | Ehmke et al. | 250/208.1 |
| 5,424,544 | 6/1995 | Shelton et al. | 250/332 |
| 5,457,318 | 10/1995 | Robinson et al. | 250/332 |
| 5,565,682 | 10/1996 | Frank et al. | 250/338.1 |
| 5,631,467 | 5/1997 | Belcher et al. | 250/338.3 |

*Primary Examiner*—Edward J. Glick
*Assistant Examiner*—Darren M. Jiron
*Attorney, Agent, or Firm*—Baker & Botts, L.L.P.

[57] ABSTRACT

A method of fabricating a focal plane array and the array having a integral slot shield which comprises fabricating a focal plane array having a plurality of detector elements. A layer of electrically insulating material having a planar top surface is then formed over the array. A reflective layer is then formed over the layer of electrically insulating material and the electrically insulating layer and reflective layer are etched only in the regions thereof over the detector elements to form slots over the detector elements. An absorbing layer is formed over the reflective layer. The absorbing layer is preferably an infrared-transparent dielectric having an optical thickness of about one quarter wavelength of the light frequency of interest with a metallic flash layer thereover having a thickness of from about 50 to about 60 Angstroms. The infrared dielectric is preferably one of zinc sulfide, zinc selenide, polyethylene and paraxylilene.

28 Claims, 2 Drawing Sheets

INTEGRAL SLOT SHIELD FOR INFRARED FOCAL PLANE ARRAYS

This application claims priority under 35 U.S.C. §119(e) of provisional application Ser. No. 60/011,590 filed Jan. 3, 1996.

BACKGROUND OF THE INVENTION

1. Field of the Invention

This invention relates to infrared focal plane arrays (IRFPAs) and, more specifically to an integral slot shield for such a focal plane array.

2. Brief Description of the Prior Art

The use of infrared focal plane arrays in tactical military applications requires control of stray reflection from the IRFPA sensor. The stray reflections are generally caused by regions of the FPA which are non-planar. This reflections control is implemented, in part, by the use of a planarizing shield to compensate for the non-planarity and surround the active sensor area. This control, in concert with the system optics, prevents stray radiation from passing back out of the system.

Prior art IRFPA shield technology consisted of a silicon piece-part which was mounted to individual IRFPAs during assembly. Although specular in appearance, the silicon used was heavily doped and antireflection coated to absorb most of the infrared radiation impinging in its surface.

The above-described prior art was improved by replacing the silicon shield with an integral metallized epoxy structure wherein the pattern could be etched. This epoxy slot shield (ESS) eliminated the need for a separate assembly operation and, since it applied to IRFPAs while still in wafer form, reduced costs and cycle time. This technology is exemplified by U.S. Pat. No. 5,298,733, the contents of which are incorporated herein by reference. Preliminary tests have shown that the ESS is slightly inferior to prior art silicon shields in reflection control, however they still perform adequately. Still later testing of IRFPAs in imaging systems showed that the highly reflective metal of the shield could produce unacceptable optical artifacts, leading to considerations for duplicating the absorptive nature of the original silicon shield.

SUMMARY OF THE INVENTION

In accordance with the present invention, there is provided an improved epoxy slot shield which includes an absorptive coating over the metallization and therefor eliminates the disadvantages of the prior art version thereof described hereinabove. A purpose of the present invention is to make the surface of the array less reflective and preferably as non-reflective as possible. This has been accomplished in a preferred embodiment of the invention by providing a dielectric layer which is transparent to infrared frequencies, preferably in the form of a conformal coating which is preferably an organic material of quarter wave thickness in the frequency range of interest, such a paraxylilene having a thickness of, for example, slightly greater than one micron for frequencies in the range of 7.5 to 10.5 microns, with a very thin transparent metallic layer thereover which is essentially metallic flash, generally from about 50 to about 60 Angstroms, though this may vary, depending upon the metal used the flash itself and its purpose per se being well known in the art.

An embodiment of this coating uses a quarter-wave coating of an infrared-transparent dielectric such as, for example, zinc sulfide, zinc selenide, polyethylene or parylene and a thin, essentially flash, transparent coating of a low conductivity metal such as, for example, nichrome over the reflective metal of the shield, preferably tungsten.

The thin top layer of metal phase-shifts radiation reflected from the underlying tungsten, leading to destructive interference. Interference coatings of this type are extremely thin but still quite effective for relatively narrow spectral bands. References to the theory of such coating can be found in selected texts on optics, such as *Optical Properties of Thin Solid Films*, by O. S. Heavens. The theory for absorptive films is mathematically intense and will not be reproduced herein but is incorporated herein by reference to the above noted Heavens text.

Alternative absorbing layers include infrared photoconductors such as, for example, mercury cadmium telluride and surface treatments such as "Martin Black". Both of these types of coatings are capable of absorbing over a wider spectral bandwidth but are significantly thicker than the interference coating described above and may also be more fragile. The disadvantage to added thickness is the exposed edge of the coating, which could lead to scattering of infrared radiation back out of the system. Any other absorbing material not mentioned above which performs the purposes of the absorbing layer herein can also be used and is contemplated by the present invention.

A major purpose of the absorbing layer is to null reflections from metallization on the shield which causes optical cross talk in the detectors, this invention providing a solution to the problem of optical cross talk.

BRIEF DESCRIPTION OF THE DRAWINGS

FIGS. 1a to 1e are a process flow in accordance with the present invention wherein FIGS. 1a to 1c are prior art.

DESCRIPTION OF THE PREFERRED EMBODIMENT

Figure 1A:
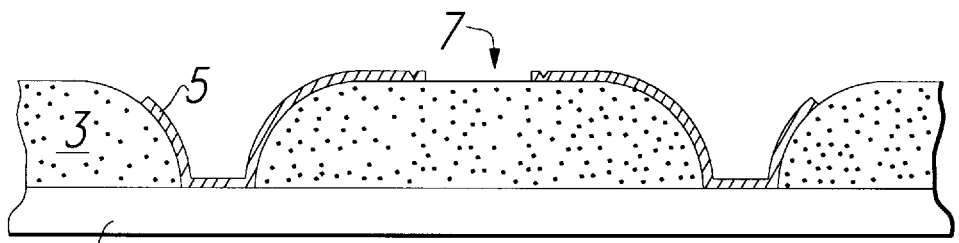

Referring first to FIG. 1a, there is shown a partially fabricated focal plane array (FPA) which includes a standard integrated circuit 1 to which has been secured in standard manner the partially fabricated detector portion of the array which is, for example, patterned mercury cadmium telluride 3. An electrically conductive layer, preferably a layer of tungsten 5, is deposited over the detector with an opening 7 therein for radiation to pass through the opening to the detector. The tungsten layer 5 makes electrical contact between the detector 3 and the integrated circuit 1 in standard manner.

Figure 1B:
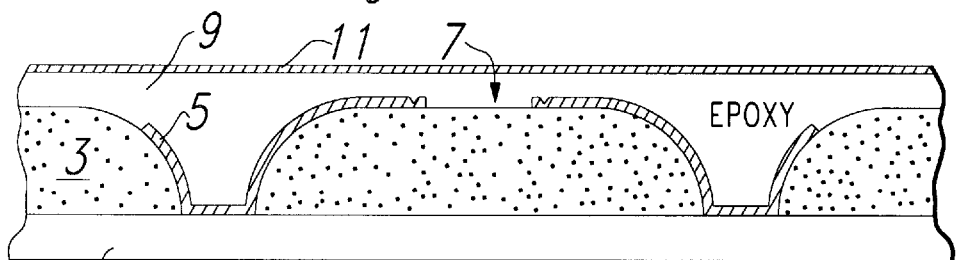
Figure 1C:
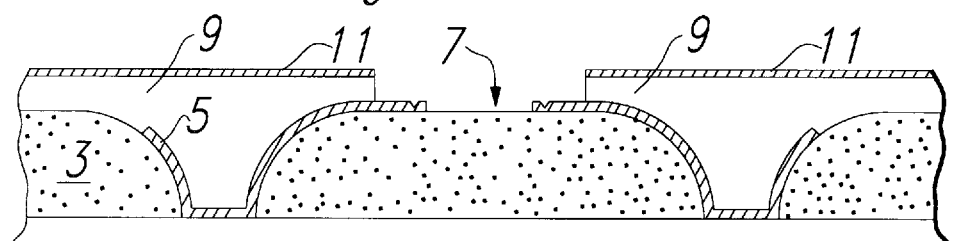

The structure of FIG. 1a is then planarized by forming a region of epoxy 9 thereover with a layer of reflective metal 11, preferably tungsten being formed over the epoxy as shown in FIG. 1b. Since the layer 11 is made of tungsten, it is inherently non-transmissive to infrared radiation, or in other words is opaque to infrared radiation. The epoxy 9 and reflective metal 11 thereover are then removed in the region over the opening 7 to expose the opening 7 and detector 3 thereunder to radiations as shown in FIG. 1c. To this point, everything is prior art and shown in the above mention patent.

Figure 1D:
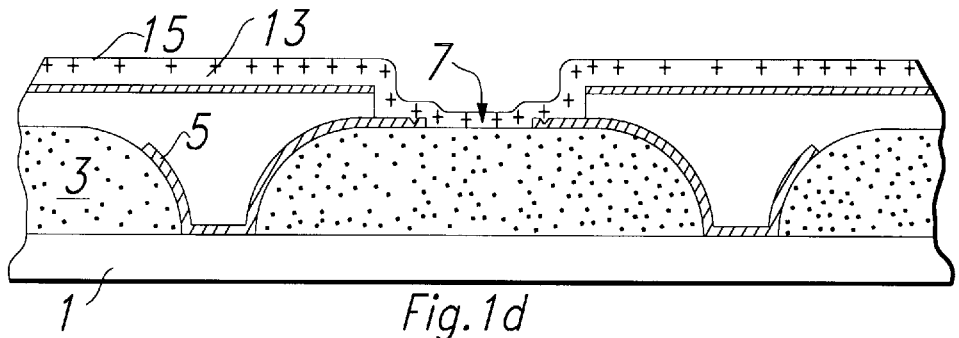
Figure 1E:
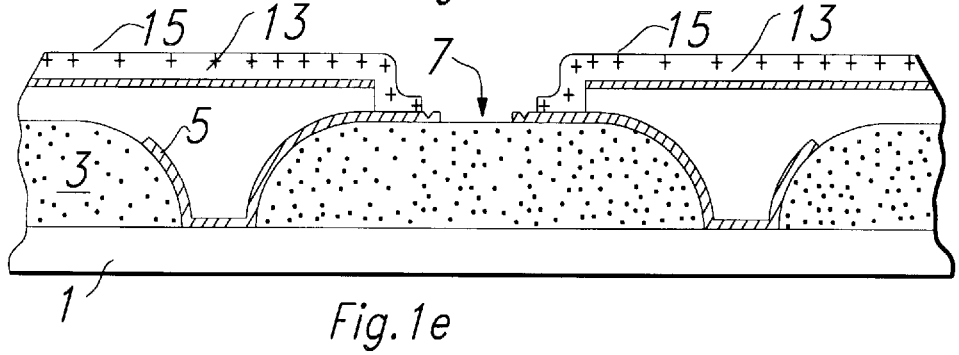

Referring now to FIG. 1d, a layer of vapor deposited paraxylilene (parylene) 13 which is one quarter wavelength thick for the frequency of interest is formed over the entire surface of the detector including the opening 7 and a layer of nichrome 15 in the form of a flash having a thickness of from about 50 to about 60 Angstroms is formed over the parylene. The parylene 13 and flash 15 are then etched away over the opening 7 as shown in FIG. 1e to provide the final integral slot shield.

Figure 2:
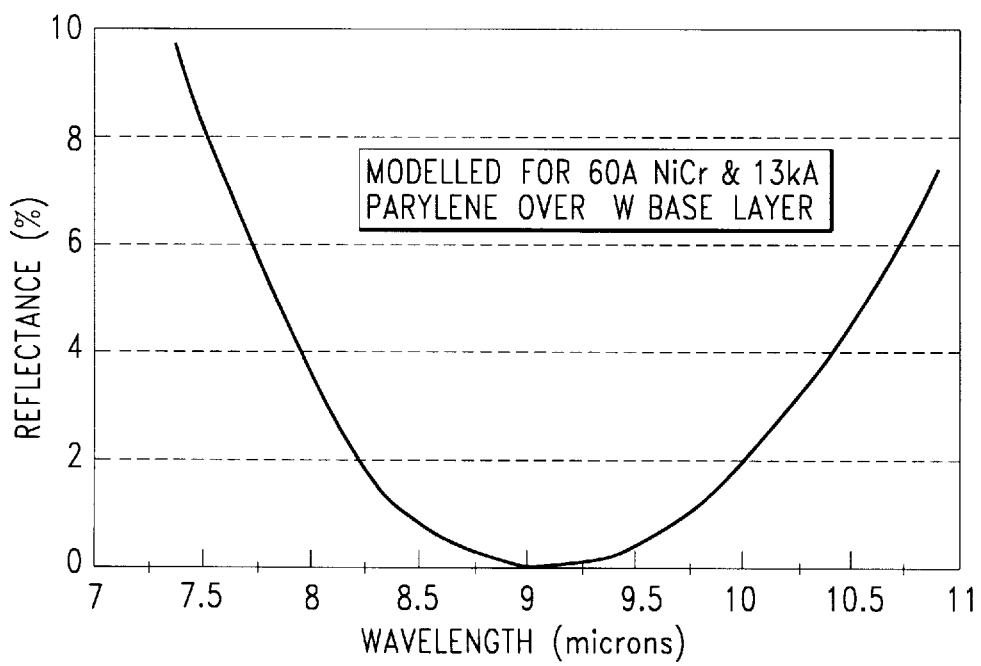
FIG. 2 is a reflectance control model for a frontside illuminated FPA showing reflectance in percent as a function of wavelength using a slot shield in accordance with the present invention having 60 Angstrom nichrome (NiCr) and 13 kAngstroms parylene over a tungsten base layer.

A typical IRFPA absorptive ESS will be required to absorb strongly in the spectral range from about 7.5 to about 10.5 micrometers wavelength. Using an embodiment described above, this can be accomplished with about 1.3 micrometers of parylene and 60 Angstroms of NiCr over tungsten, giving absorption as shown in FIG. 2.

Though the invention has been described with reference to a specific preferred embodiment thereof, many variations and modifications will immediately become apparent to those skilled in the art. It is therefore the intention that the appended claims be interpreted as broadly as possible in view of the prior art to include all such variations and modifications.

We claim:

1. A method of fabricating a focal plane array system having a slot shield, comprising the steps of:
   (a) fabricating a focal plane array having a plurality of detector elements;
   (b) forming over said array a layer of electrically insulating material having a planar top surface;
   (c) forming an opaque layer over said layer of electrically insulating material;
   (d) forming an absorbing layer over said opaque layer; and
   (e) forming slots over said detector elements through said electrically insulating layer, said opaque layer and said absorbing layer.

2. The method of claim 1 wherein said step of forming an absorbing layer includes the steps of forming a layer of an infrared-transparent material over said opaque layer and then forming a metallic flash layer over said infrared-transparent layer.

3. The method of claim 2 wherein said flash layer is from about 50 to about 60 Angstroms thick.

4. The method of claim 3 wherein said infrared-transparent layer is an infrared-transparent dielectric having a thickness of about one quarter wavelength of an infrared frequency of interest.

5. The method of claim 4 wherein said infrared-transparent dielectric is selected from the group consisting of zinc sulfide, zinc selenide, polyethylene and paraxylilene.

6. The method of claim 2 wherein said infrared-transparent layer is an infrared-transparent dielectric having a thickness of about one quarter wavelength of an infrared frequency of interest.

7. The method of claim 6 wherein said infrared-transparent dielectric is selected from the group consisting of zinc sulfide, zinc selenide, polyethylene and paraxylilene.

8. The method of claim 2, wherein said step of forming said slots through said electrically insulating layer and said opaque layer is carried out before said steps of forming said infrared-transparent layer and forming said flash layer; and wherein said step of forming said slot through said absorbing layer is carried out by simultaneously forming slots through said infrared-transparent layer and said flash layer after said steps of forming said infrared-transparent layer and said flash layer.

9. The method of claim 1 wherein said absorbing layer includes an infrared-transparent dielectric having a thickness of about one quarter wavelength of an infrared frequency of interest and includes on said infrared-transparent dielectric a metallic flash having a thickness of from about 50 to about 60 Angstroms.

10. The method of claim 9 wherein said infrared-transparent dielectric is selected from the group consisting of zinc sulfide, zinc selenide, polyethylene and paraxylilene.

11. The method of claim 1, wherein said step of forming said absorbing layer is carried out after said step of forming slots through said electrically insulating layer and said opaque layer; and wherein said step of forming said slot through said absorbing layer is carried out after said step of forming said absorbing layer.

12. A focal plane array system comprising:
   (a) a focal plane array having a plurality of detector elements;
   (b) a layer of electrically insulating material having a planar top surface disposed over said array;
   (c) an opaque layer disposed over said layer of electrically insulating material; and
   (d) an absorbing layer disposed over said opaque layer;
   (e) said insulating layer, said absorbing layer and said opaque layer having slots therein disposed over said detector elements.

13. The array of claim 12 wherein said absorbing layer comprises a layer of an infrared-transparent material over said opaque layer and a metallic flash layer over said infrared-transparent layer.

14. The array of claim 13 wherein said flash layer is from about 50 to 60 Angstroms thick.

15. The array of claim 14 wherein said infrared-transparent layer is an infrared-transparent dielectric having a thickness of about one quarter wavelength of an infrared frequency of interest.

16. The array of claim 15 wherein said infrared-transparent dielectric is selected from the group consisting of zinc sulfide, zinc selenide, polyethylene and paraxylilene.

17. The array of claim 13 wherein said infrared-transparent layer is an infrared-transparent dielectric having a thickness of about one quarter wavelength of an infrared frequency of interest.

18. The array of claim 17 wherein said infrared-transparent dielectric is selected from the group consisting of zinc sulfide, zinc selenide, polyethylene and paraxylilene.

19. The array of claim 12 wherein said absorbing layer includes an infrared-transparent dielectric having a thickness of about one quarter wavelength of an infrared frequency of interest and includes on said infrared-transparent dielectric a metallic flash having a thickness of from about 50 to about 60 Angstroms.

20. The array of claim 19 wherein said infrared-transparent dielectric is selected from the group consisting of zinc sulfide, zinc selenide, polyethylene and paraxylilene.

21. A method of fabricating an integrated circuit, comprising the steps of:
   fabricating a focal plane array having a plurality of detector elements;
   forming over the array a shield layer having on a side thereof remote from the array a substantially planar top surface, and being opaque and absorptive to infrared radiation impinging on the top surface; and
   forming through the shield layer a plurality of openings which are each disposed over a respective one of the detector elements.

22. The method according to claim 21, wherein said step of forming the shield layer includes the steps of forming an opaque layer over the array and forming an absorbing layer over the opaque layer, the opaque layer and the absorbing layer each having therethrough a plurality of openings which each serve as portion of a respective one of the openings through the shield layer.

23. A method according to claim 22, wherein said step of forming the opaque layer is carried out using a material which is electrically conductive, and wherein said step of forming the shield layer includes the step of forming an electrically insulating layer over the array prior to said step of forming the opaque layer, the opaque layer being formed over the electrically insulating layer.

24. A method according to claim 22, wherein said step of forming the absorbing layer is carried out by forming an infrared-transparent layer over the opaque layer, and thereafter forming a metallic flash layer over the infrared-transparent layer, the infrared-transparent layer and the flash layer each having therethrough a plurality of openings which each serve as a portion of a respective one of the openings through the shield layer.

25. An integrated circuit, comprising: a focal plane array having a plurality of detector elements; and a shield layer disposed over said array and having therethrough a plurality of openings which are each disposed over a respective said detector element, said shield layer being integral to said integrated circuit and having a substantially planar top surface on a side thereof remote from said array, having first means for rendering said shield layer opaque to infrared radiation impinging upon said top surface, and having second means for causing said shield layer to absorb infrared radiation impinging upon said top surface.

26. An integrated circuit according to claim 25, wherein said first means includes within said shield layer an opaque layer which has therethrough a plurality of openings that each serve as a portion of a respective said opening through said shield layer, and wherein said second means includes an absorbing layer provided over said shield layer and having therethrough a plurality of openings which each serve as a portion of a respective said opening through said shield layer.

27. The integrated circuit according to claim 26, wherein said opaque layer is electrically conductive, and wherein said shield layer includes an electrically insulating layer disposed between said opaque layer and said array, said electrically insulating layer having therethrough a plurality of openings which each serve as a portion of a respective said opening through said shield layer.

28. The integrated circuit according to claim 26, wherein said absorbing layer includes an infrared-transparent layer disposed over said opaque layer, and a metallic flash layer disposed over said infrared-transparent layer, said infrared-transparent layer and said flash layer each having therethrough a plurality of openings which each serve as a portion of respective said opening through said shield layer.

* * * * *